United States Patent
Zhu et al.

(10) Patent No.: US 8,832,840 B2
(45) Date of Patent: Sep. 9, 2014

(54) MOBILE APPLICATION SECURITY AND MANAGEMENT SERVICE

(75) Inventors: Fang Julie Zhu, Woburn, MA (US); Xu Clark Yang, Malden, MA (US); Jack Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 261 days.

(21) Appl. No.: 13/281,972

(22) Filed: Oct. 26, 2011

(65) Prior Publication Data

US 2013/0111592 A1    May 2, 2013

(51) Int. Cl.
*H04L 29/06* (2006.01)
*G06F 21/57* (2013.01)
*G06F 21/51* (2013.01)
*G06F 21/50* (2013.01)

(52) U.S. Cl.
CPC ............ *G06F 21/577* (2013.01); *G06F 21/51* (2013.01); *G06F 21/50* (2013.01)
USPC ............................ 726/25; 713/152; 713/166

(58) Field of Classification Search
CPC ........ G06F 21/577; G06F 21/50; G06F 21/51
USPC ........................................................... 726/25
See application file for complete search history.

(56) References Cited

U.S. PATENT DOCUMENTS

| | | | |
|---|---|---|---|
| 7,552,480 B1 * | 6/2009 | Voss | 726/25 |
| 2002/0104014 A1 * | 8/2002 | Zobel et al. | 713/200 |
| 2006/0020814 A1 * | 1/2006 | Lieblich et al. | 713/182 |
| 2007/0239495 A1 * | 10/2007 | Osborn et al. | 705/7 |
| 2008/0051076 A1 * | 2/2008 | O'Shaughnessy et al. | 455/419 |
| 2008/0120611 A1 * | 5/2008 | Aaron | 717/174 |
| 2008/0189788 A1 * | 8/2008 | Bahl | 726/25 |
| 2010/0125911 A1 * | 5/2010 | Bhaskaran | 726/23 |
| 2010/0262444 A1 * | 10/2010 | Atwal et al. | 705/7 |

OTHER PUBLICATIONS

Aramudhan, M., User assigned security policy framework for m-commerce applications, May 2008, International Conference on Computer and Communication Engineering, pp. 148-150.*

* cited by examiner

*Primary Examiner* — Mohammad L Rahman
*Assistant Examiner* — Kenneth Chang (57) ABSTRACT

A system is configured to receive a list of applications installed on a user device; obtain application profiles that identify risk levels associated with the applications; obtain a user profile that identifies a job level, security risk level, or an access level to confidential information associated with the user of the user device; identify a highest risk level authorized for the user device based on whether the job level is greater than a first threshold, the security risk level is greater than a second threshold, or the access level is greater than a third threshold; determine whether any of the risk levels are greater than the highest risk level; and transmit a notification that one of the applications is to be removed from the user device when one of the risk levels, associated with the one of the applications, is greater than the highest risk level.

20 Claims, 9 Drawing Sheets

| USER ID 505 | POSITION LEVEL 515 | USAGE HISTORY 525 | JOB CLASSIFICATION 530-1 | JOB CLASSIFICATION 530-2 | ... |
|---|---|---|---|---|---|
| | POSITION TITLE 510 | PRIVILEGE LEVEL 520 | | | |

| APPLICATION ID 605 | APPLICATION RATINGS 610 |
| APPLICATION TYPE 615 | APPLICATION HISTORY 620 |
| APPLICATION RESOURCE USAGE 625 | APPLICATION SCORE 630 |

MOBILE APPLICATION SECURITY AND MANAGEMENT SERVICE

BACKGROUND

User devices perform an increasing variety of tasks that allows users to make and receive calls, send and receive messages (e.g., emails, instant messages, etc.), surf the Internet, play games, make electronic purchases, perform social networking, etc. Many of the tasks are performed using applications that are installed on and executed by the user devices.

Unfortunately, some of the applications may be downloaded to and/or installed on the user devices (e.g., such as user devices issued to users by employers) that are not authorized to be downloaded or installed on the user devices (e.g., based on employer policies, etc.). Additionally, some of the applications may be created by an unknown or untrustworthy source, perform poorly (e.g., by executing slowly, consuming large amount of memory or processing resources, etc.), and/or include malicious software (e.g., viruses, spyware, etc.). These applications can damage the user devices, cause performance of the user devices to degrade, and/or cause a network (e.g., enterprise networks of the employers, etc.), with which the user device communicates, to become damaged or disrupted.

DETAILED DESCRIPTION OF PREFERRED EMBODIMENTS

The following detailed description refers to the accompanying drawings. The same reference numbers in different drawings may identify the same or similar elements.

A system and/or method, described herein, may allow a server device, associated with a network (e.g., an enterprise network or some other network), to monitor and/or control applications that have been downloaded to a user device that communicates with and/or is subscribed to the network. The system and/or method may permit the server device to communicate with the user device to obtain a list of applications that are stored on the user device. The system and/or method may allow the server device to generate and/or obtain a user profile, associated with a user of the user device, that identifies a first level of risk associated with the user. The system and/or method may allow the server device to obtain application profiles, associated with the list of applications, that identify levels of risk associated with the applications.

The system and/or method may allow the server device to identify an unauthorized application, that is not authorized to be stored on the user device, based on the user profile and the application profiles. More particularly, the system and/or method may allow the server device to identify the unauthorized application when a second level of risk, associated with the unauthorized application and obtained from an application profile, is greater than the first level of risk associated with the user. The system and/or method may cause the server device to transmit, to the user device, a notification that indicates that the unauthorized application is stored on the device. The system and/or method may, as a result of the notification, allow the user device to remove the unauthorized application from the user device, and/or to disable or otherwise render inoperable the unauthorized application.

Managing and/or controlling applications that are stored, on the user device, may protect the network from damage or disruption caused by the unauthorized application stored on the user device. Additionally, or alternatively, managing and/or controlling the applications may protect the user device from damage or degraded performance caused by the unauthorized application.

Figure 1:
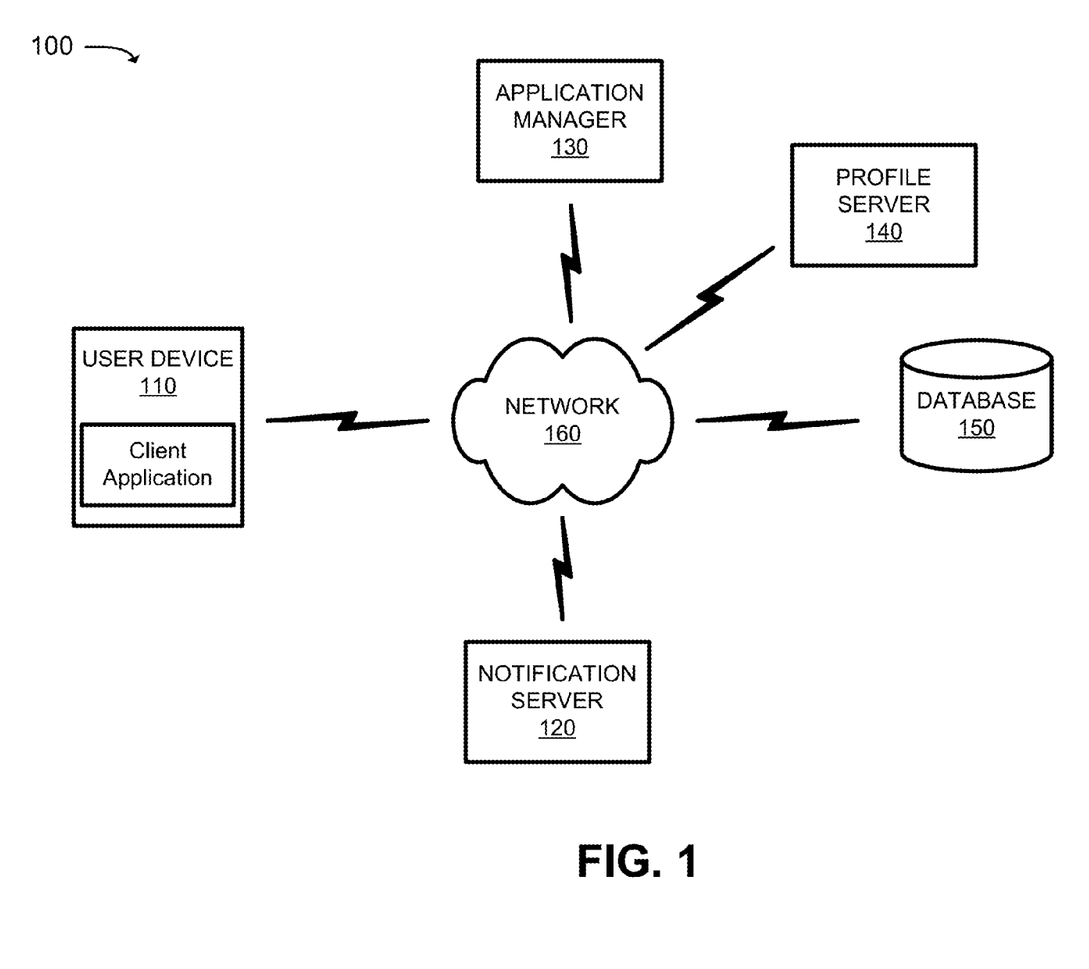
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a user device 110, a notification server 120, an application manager 130, a profile server 140, and a database 150, interconnected by network 160. The number of devices and/or networks, illustrated in FIG. 1, is provided for explanatory purposes only. In practice, there may be additional devices and/or networks, fewer devices and/or networks, different devices and/or networks, or differently arranged devices and/or or networks than illustrated in FIG. 1.

Also, in some implementations, one or more of the devices of environment 100 may perform one or more functions described as being performed by another one or more of the devices of environment 100. For example, application manager 130, profile server 140, and/or database 150 may be combined into a single device. Devices of environment 100 may interconnect via wired connections, wireless connections, or a combination of wired and wireless connections.

User device 110 may include any computation and/or communication device, such as a wireless mobile communication device that is capable of communicating with network 160. For example, user device 110 may include a desktop computer, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, a camera, a personal gaming system, a smart phone, or another type of computation and/or communication device.

User device 110 may host a client application that allows user device 110 to monitor or audit applications stored on user device 110. User device 110 may use the client application to generate a list of the applications and may transmit the list of applications to application manager 130. User device 110 may use the client application to detect an application being downloaded to, stored on, and/or installed on user device 110, and may transmit, to application manager 130, a notification that the application is being downloaded. The client application may also cause user device 110 to remove, disable, or uninstall the unauthorized application stored on user device 110.

Notification server 120 may include one or more server devices, or other types of computation and/or communication devices capable of communicating with network 160. In an example implementation, notification server 120 may facilitate communications between user device 110 and application manager 130 and/or profile server 140. Notification server 120 may communicate with user device 110 to register user device 110 and may provide registration information to user device 110 that allows user device 110 to communicate with application manager 130. Notification server 120 may register application manager 130 so that application manager 130 may communicate, via notification server 120, with user device 110. Notification server 120 may convert communications destined for user device 110 (e.g., based on a hypertext transfer protocol (HTTP) or some other protocol or format), received from application manager 130, to a protocol (e.g., a short message service (SMS) protocol, etc.) that can be received and/or processed by user device 110.

Application manager 130 may include one or more server devices, or other types of computation and/or communication devices, that gather, process, search, store, and/or provide information in a manner described herein. Application manager 130 may, in one example, be associated with an enterprise (e.g., a business, organization, association, etc.) that desires to manage and/or control applications that are downloaded, stored, and/or installed on user devices 110 associated with the enterprise and/or that subscribe to a network (e.g., network 160), associated with the enterprise.

Application manager 130 may communicate with user device 110, via notification server 120, to obtain a list of applications that are installed on user device 110. Application manager 130 may obtain, from database 150, a user profile, associated with the user of user device 110, that identifies a job title, type of job held, tenure within the enterprise, a usage history, a level of access to confidential information, etc. Application manager 130 may, based on the user profile, identify a level of risk associated with the user. The level of risk, associated with the user, may represent a highest level of risk that is permitted for an application to be stored on user device 110.

Application manager 130 may obtain, from database 150, one or more application profiles associated with the list of applications. The application profile may identify levels of risk associated with applications identified in the list of applications. Application manager 130 may determine whether any of the applications, installed on user device 110, are unauthorized applications based on whether any of the identified levels of risk, associated with the list of applications, are greater than the level of risk associated with the user. Application manager 130 may transmit a notification that an unauthorized application is installed on user device 110, when application manager 130 identifies the unauthorized application within the list of applications obtained from user device 110.

Profile server 140 may include one or more server devices, or other types of computation and/or communication devices, that gather, process, search, store, and/or provide information in a manner described herein. Profile server 140 may generate and/or manage a list of applications that are available to be downloaded to user device 110. Profile server 140 may evaluate each application and, based on the evaluation, may assign a respective score to each application that represents a level of risk associated with the application. The assigned score may be based on a number of pre-determined parameters associated with security, resource usage, application performance, application type, user feedback (e.g., ratings), a period of time on the market, etc. When an application is identified that is not included on the list of available applications, profile server 140 may evaluate the application, assign a score to the identified application, and/or add the identified application to the list of available applications.

Database 150 may include one or more devices that store information and/or data received via network 160. Database 150 may store user profiles and/or application profiles that can be accessed by application manager 130 and/or profile server 140.

Network 160 may include one or more wired and/or wireless networks. For example, network 160 may include a cellular network, the Public Land Mobile Network (PLMN), and/or a second generation (2G) network, a third generation (3G) network, a fourth generation (4G) network, a fifth generation (5G) network, and/or another network (e.g., a long term evolution (LTE) network). Additionally, or alternatively, network 160 may include a wide area network (WAN), a metropolitan area network (MAN), an ad hoc network, an intranet, the Internet, and/or a combination of these or other types of networks.

Figure 2:
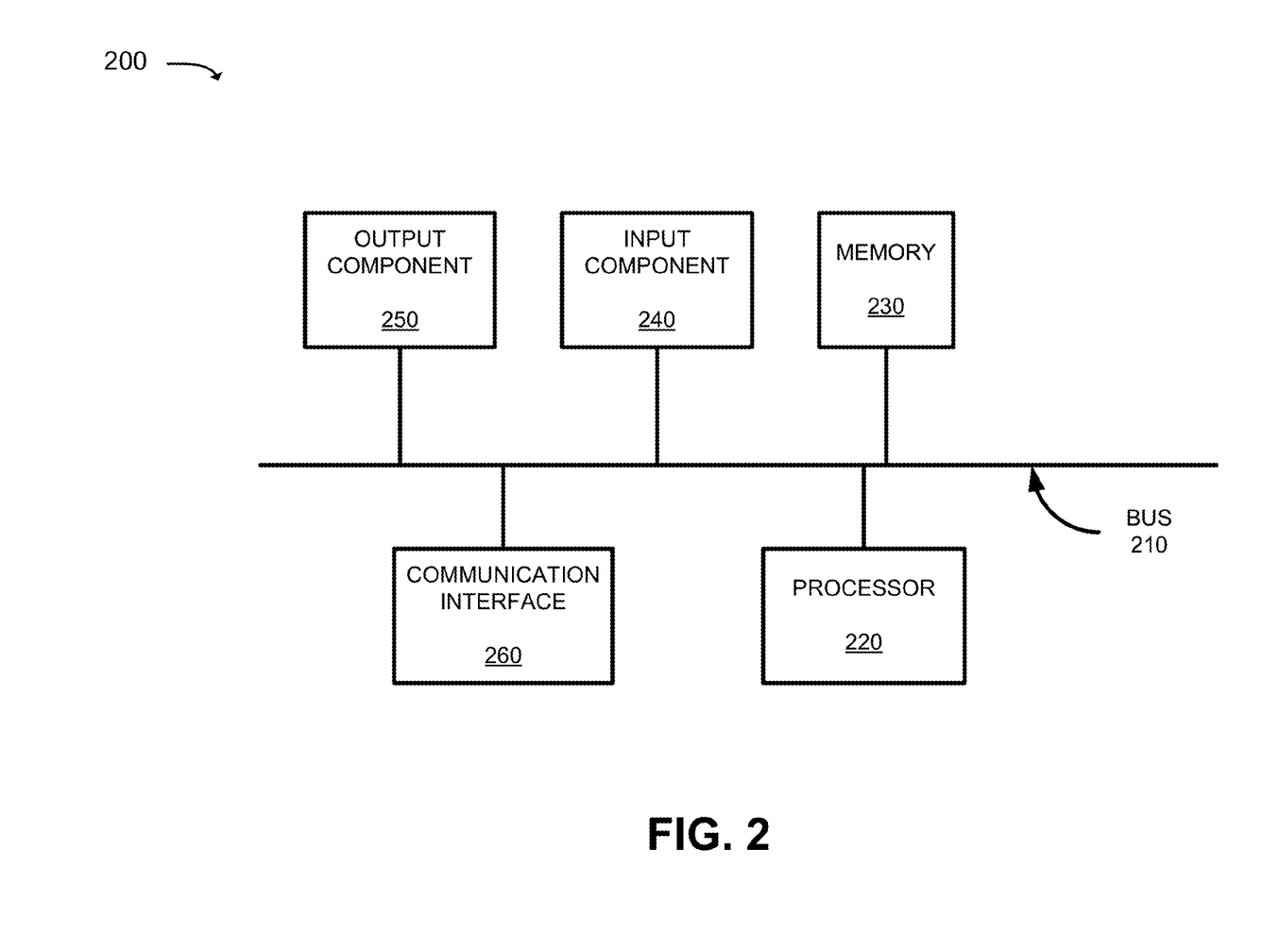
FIG. 2 is a diagram of example components of one or more of the devices depicted in FIG. 1.

FIG. 2 is a diagram of example components of a device 200 that may correspond to user device 110, notification server 120, application manager 130, and/or profile server 140. Alternatively, each of user device 110, notification server 120, application manager 130, and/or profile server 140 may include one or more devices 200 and/or one or more components of device 200. Device 200 may include a bus 210, a processor 220, a memory 230, an input component 240, an output component 250, and a communication interface 260. In another implementation, device 200 may include additional components, fewer components, different components, or differently arranged components than are shown in FIG. 2.

Bus 210 may include a path that permits communication among one or more of the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include a mechanism that permits a user to input information to device 200, such as a keyboard, a keypad, a pointing device, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems. For example, communication interface 260 may include an Ethernet interface, an optical interface, a coaxial interface, or the like.

As will be described in detail below, device 200 may perform certain operations relating to mobile application security and management. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
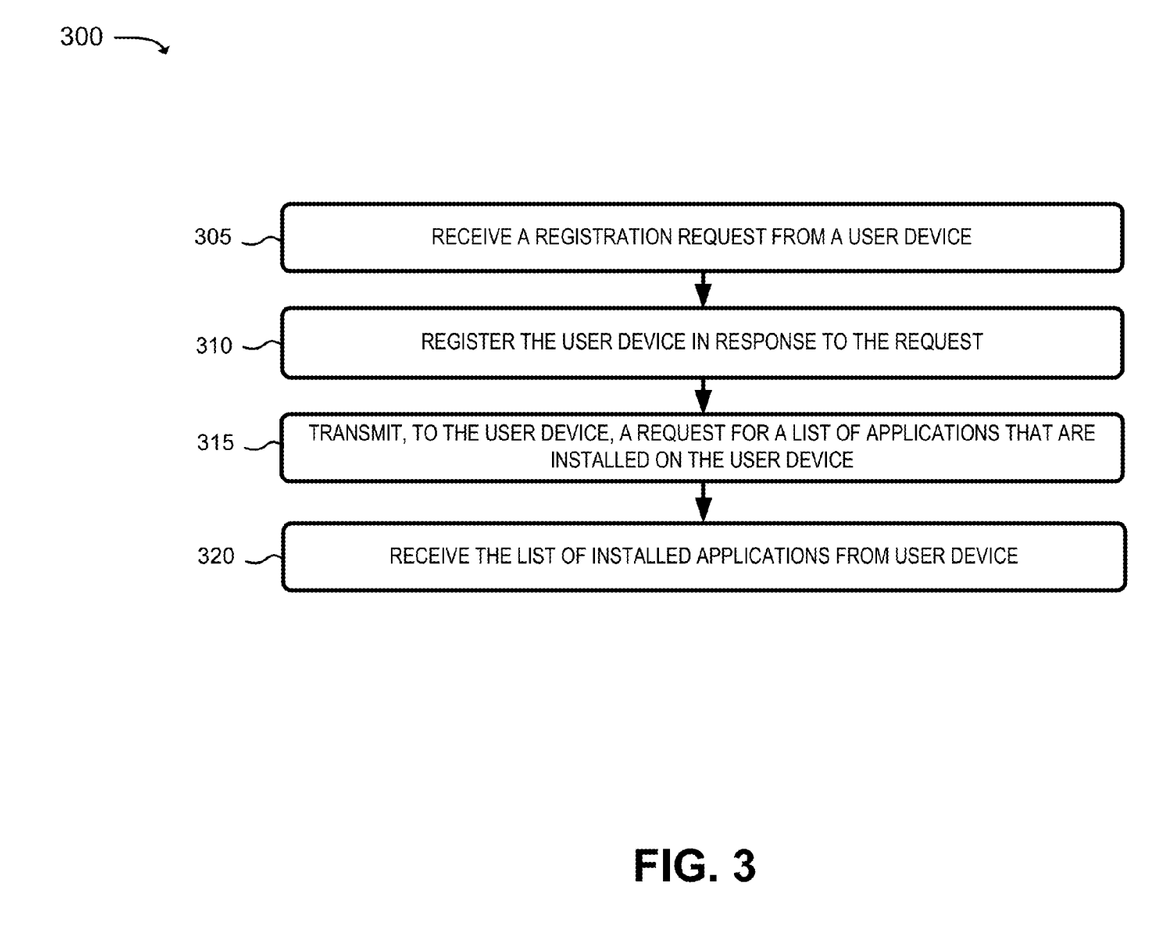
FIG. 3 is a flow chart of an example process for registering a user device to receive application security and management services, according to an implementation described herein.
Figure 4:
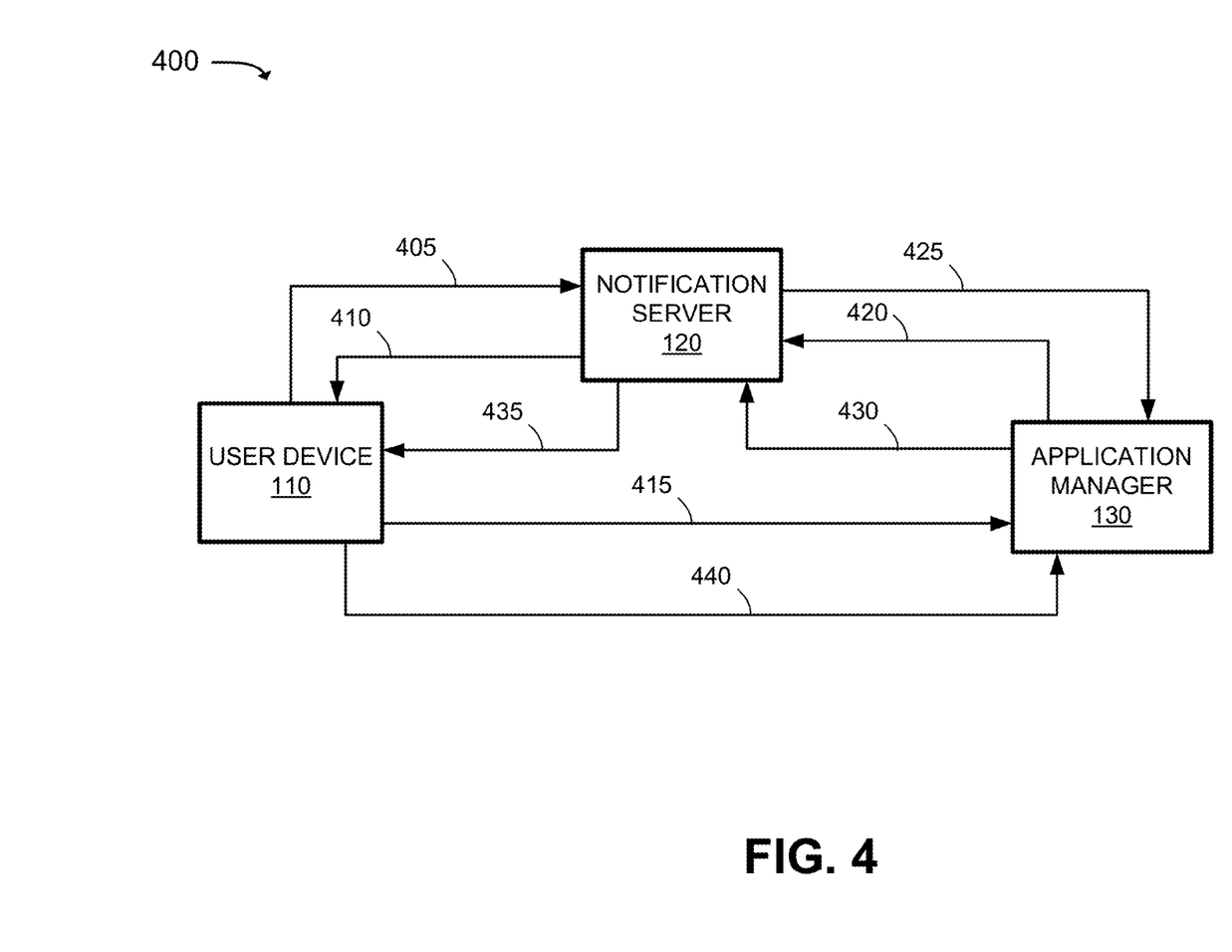
FIG. 4 is a diagram of example interactions, associated with registering a user device, between devices associated with a portion of the environment of FIG. 1.

FIG. 3 is a flow chart of an example process 300 for registering a user device to receive security and management services, according to an implementation described herein. In one implementation, process 300 may be performed by application manager 130. In another implementation, some or all of process 300 may be performed by a device or collection of devices separate from, or in combination with, application manager 130. FIG. 4 is a diagram of interactions, associated with registering user device 110, between devices associated with an example portion 400 of the environment 100. In the description below, all or a portion of FIG. 3 will be described with references to portion 400 of FIG. 4.

As shown in FIG. 3, process 300 may include receiving a registration request from a user device (block 305) and registering the user device in response to the request (block 310). For example, as shown in FIG. 4, user device 110 may transmit, to notification server 120, a request 405 to register user device 110 with application manager 130. Notification server 120 may receive request 405, and may determine whether information, associated with user device 110 and received in request 405, matches information associated with user device 110 stored in a memory associated with notification server 120. Based on a determination that the received information associated with user device 110 does not match the stored information associated with user device 110, notification server 120 may not authenticate user device 110. If, however, notification server 120 determines that the received information associated with user device 110 matches the stored information associated with user device 110, notification server 120 may generate information that uniquely identifies user device 110 (e.g., a device identifier, etc.). Notification server 120 may transmit, to user device 110, a notification 410 that indicates that user device 110 is authenticated and/or is permitted to communicate with application manager 130 using information that uniquely identifies user device 110.

User device 110 may receive notification 410 and may transmit, to application manager 130, a registration request 415 that includes the information that uniquely identifies user device 110. Application manager 130 may receive registration request 415 and may transmit, to notification server 120, a registration request 420 that includes the information that uniquely identifies user device 110. Notification server 120 may receive registration request 420 and may transmit, to application manager 130, a registration confirmation 425 that includes information (e.g., a registration token, a lease, etc.), associated with user device 110, that allows application manager 130 to communicate with user device 110. Application manager 130 may receive registration confirmation 425 and may register user device 110.

As also shown in FIG. 3, process 300 may include transmitting, to the user device, a request for a list of applications that are installed on the user device (block 315) and receiving the list of installed applications from the user device (block 320). For example, application manager 130 may transmit, to notification server 120, a request 430 for a list of applications that are stored and/or installed on user device 110. Request 430 may be transmitted using a protocol (e.g., HTTP or some other protocol). Notification server 120 may receive request 430 and may transmit, to user device 110, a request 435 for the list of applications based on another protocol (e.g., a SMS protocol or some other protocol).

User device 110 may receive request 435 and may cause a client application, associated with an application security and management service, to execute to identify applications 440 that are stored and/or installed on user device 110. User device 110 may transmit, to application manager 130, the identified applications 440 (e.g., in a list of the identified applications 440 and/or in some other format) and application manager 130 may receive list of applications 440.

Figure 5:
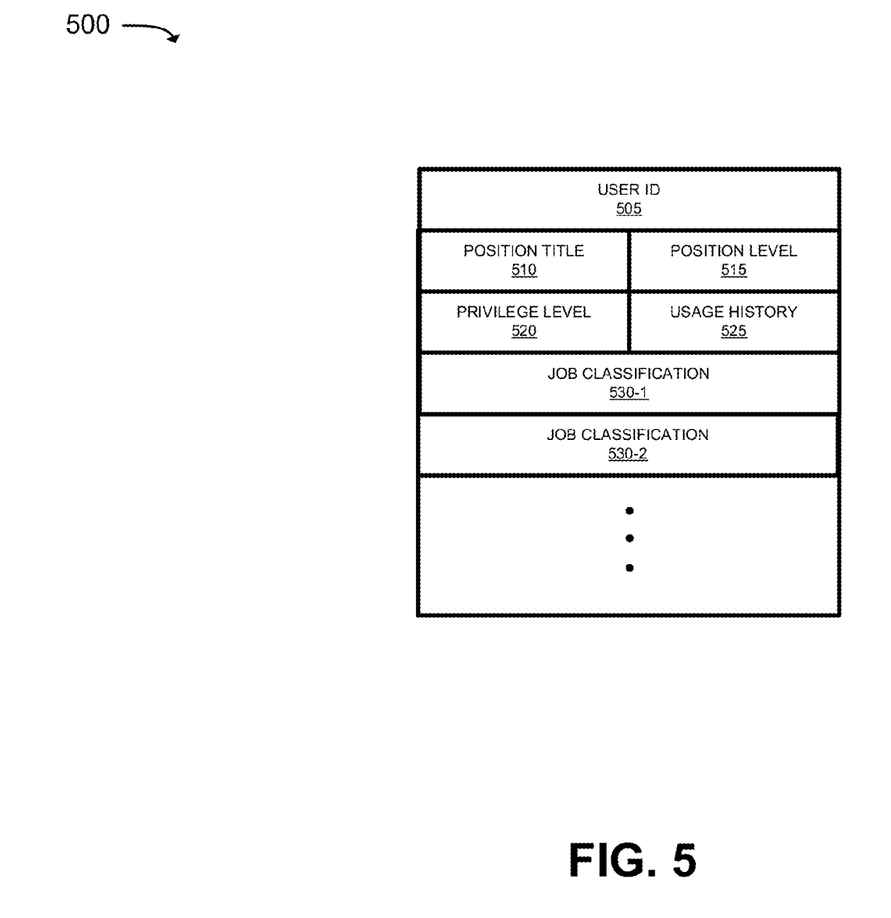
FIG. 5 is a diagram of an example data structure that stores a user profile according to an implementation described herein.

FIG. 5 is a diagram of an example data structure 500 that stores a user profile according to an implementation described herein. Data structure 500 may be stored in database 150, and/or a memory associated with application manager 130 and/or profile server 140. As shown in FIG. 5, data structure 500 may include a collection of fields, such as a user identifier (ID) field 505, a position title field 510, a position level field 515, a privilege level field 520, a usage history field 525, and a group of job classification fields 530-1, 530-2 (hereinafter referred to collectively as "job classification fields 530" and individually as "job classification field 530"). The quantity of fields, in data structure 500, is included for explanatory purposes. In another implementation, there may be additional fields, fewer fields, different fields, or differently arranged fields than are shown in data structure 500.

User ID field 505 may store information associated with a user (e.g., a username, password, personal identification number (PIN), etc.) of user device 110. The information associated with the user may also, or alternatively, include information that uniquely identifies user device 110 (e.g., a mobile directory number (MDN), a landline directory number (LDN), a device identifier, etc.), a network address associated with user device 110 (e.g., an IP address, a media access control (MAC) address, etc.), etc. Position title field 510 may store information (e.g., a name, title, an identifier, etc.), that identifies a position and/or job (e.g., president, vice president, accountant, engineer, sales person, secretary, etc.), within an enterprise, held by the user of user device 110.

Position level field 515 may store information (e.g., a rank, a value, etc.) that represents a position level, a pay grade, a seniority level, etc., associated with the position identified in position title field 510. For example, a position level, associated with a highest ranking position within the enterprise (e.g., president), may correspond to a first position value (e.g., 1 or some other value). A position level of a next-highest ranking position (e.g., vice president) may corresponds to second position value (e.g., 2 or some other value). Other position levels may correspond to other position values (e.g., 3, 4, etc.) within the enterprise.

Privilege level field 520 may store information identifying a relative level of access (e.g., high, medium, low, etc.) that the user, identified in user ID field 505, is authorized to access confidential information associated with the enterprise.

Usage history field 525 may store information relating to a usage history associated with the user identified in user ID field 505. For example, the usage history may identify whether the user has been associated with a security incident involving a breach in security (e.g., an unauthorized disclosure of confidential information, failure to secure confidential information, etc.). The usage history may, for example, identify facts, inferences, etc. associated with the incident, a quantity of incidents within a period of time, a severity of incidents, measures taken to correct the breach, etc.

Job classification field 530 may store information that identifies a type of position held by the user of user device 110. For example, job classification field 530 may store information that identifies a type of position (e.g., sales, executive, shipping, warehousing, research, etc.), an organization within the enterprise to which the position is assigned (e.g., engineering, accounting, human resources, production, etc.), particular job functions associated with the position (e.g., employee counseling, invoice processing, contract negotiation, truck driver, etc.), etc. Additionally, or alternatively, job classification field 530 may store information that identifies a type of application that corresponds to the type of position, job function, etc.

Figure 6:
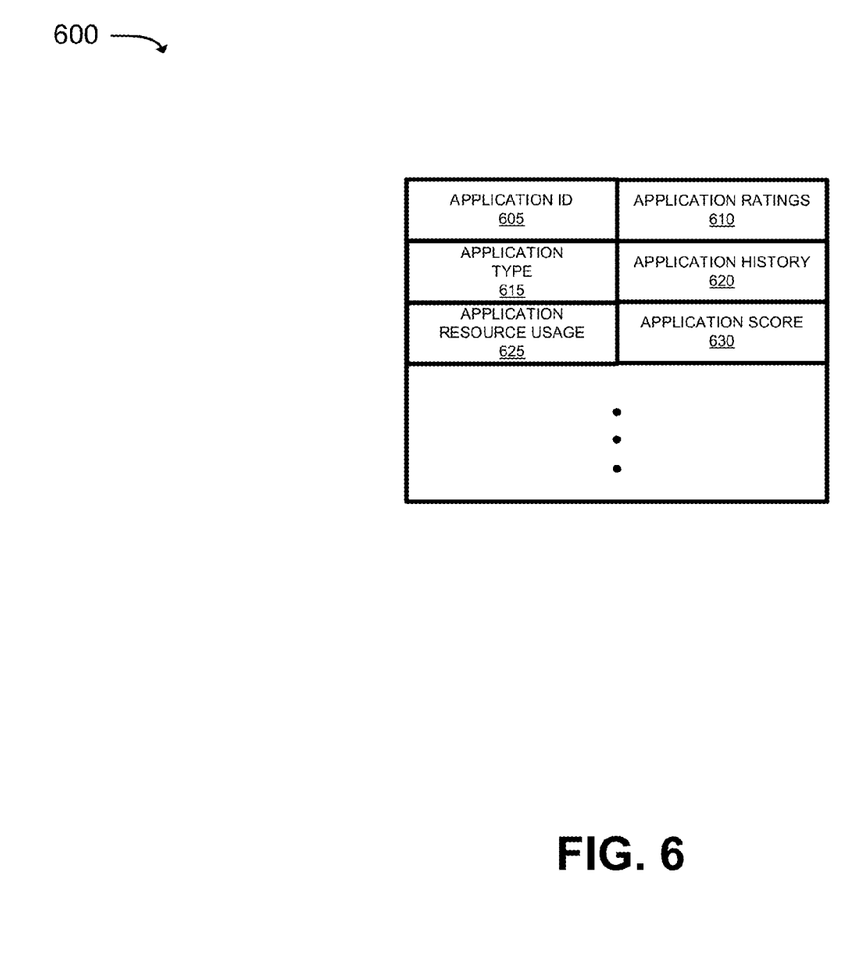
FIG. 6 is a diagram of an example data structure that stores an application profile according to an implementation described herein.

FIG. 6 is a diagram of an example data structure 600 that stores an application profile according to an implementation described herein. Data structure 600 may be stored in database 150, and/or a memory associated with application manager 130 and/or profile server 140. As shown in FIG. 6, data structure 600 may include a collection of fields, such as an application identifier (ID) field 605, an application ratings field 610, an application type field 615, an application history field 620, application resource usage field 625, and an application score field 630. The quantity of fields, in data structure 600, is included for explanatory purposes. In another implementation, there may be additional fields, fewer fields, different fields, or differently arranged fields than are shown in data structure 600.

Application ID field 605 may store information associated with a particular application that is available to be downloaded to user device 110. The information associated with the particular application may include a unique identifier (e.g., an application identifier, an application signature or certificate, or some other identifier), information associated with a vendor of the application (e.g., a name, a vendor identifier, etc.), information associated with an author of the application (e.g., a name, an author identifier, etc.).

Application ratings field 610 may store information relating to ratings, associated with the particular application, by users of other user devices 110. In one example, application ratings field 610 may store a ratings value that corresponds to a degree to which positive ratings have been received from the other users.

Application type field 615 may store information that identifies a type of application to which the particular application corresponds. Application type field 615 may identify the particular application as one of a variety of types of applications associated with gaming, accounting, engineering, mathematics, business, etc.

Application history field 620 may store information associated with a history of the particular application. The information associated with the history may identify whether the particular application is known to have been associated with a security incident (e.g., associated with a loss of data, malicious software, etc.), has caused a condition to occur on a network (e.g., network 160), has caused a condition to occur on one or more user devices 110, etc. In one example, application history field 620 may store a security value that corresponds to the severity and/or the quantity of security incidents, conditions, etc.

Application resource usage field 625 may store information that identifies a relative quantity of resources (e.g., memory usage, processing capacity, bandwidth utilization, etc.) that are expected to be used when the application is executing on user device 110. In one example, application resource usage field 625 may store a usage value that corresponds to a quantity of resources used by the application.

Application score field 630 may identify a level of application risk associated with the application. The level of application risk may be associated with resource usage, application ratings, security risk, etc., identified by information stored within data structure 600. In one example, the level of risk may be represented by an application score based on the ratings value identified by application ratings field 610, the security value identified by application history field 620, and/or the usage value identified by application resource usage field 625. The application score will be described in greater detail below with respect to FIG. 7.

Figure 7:
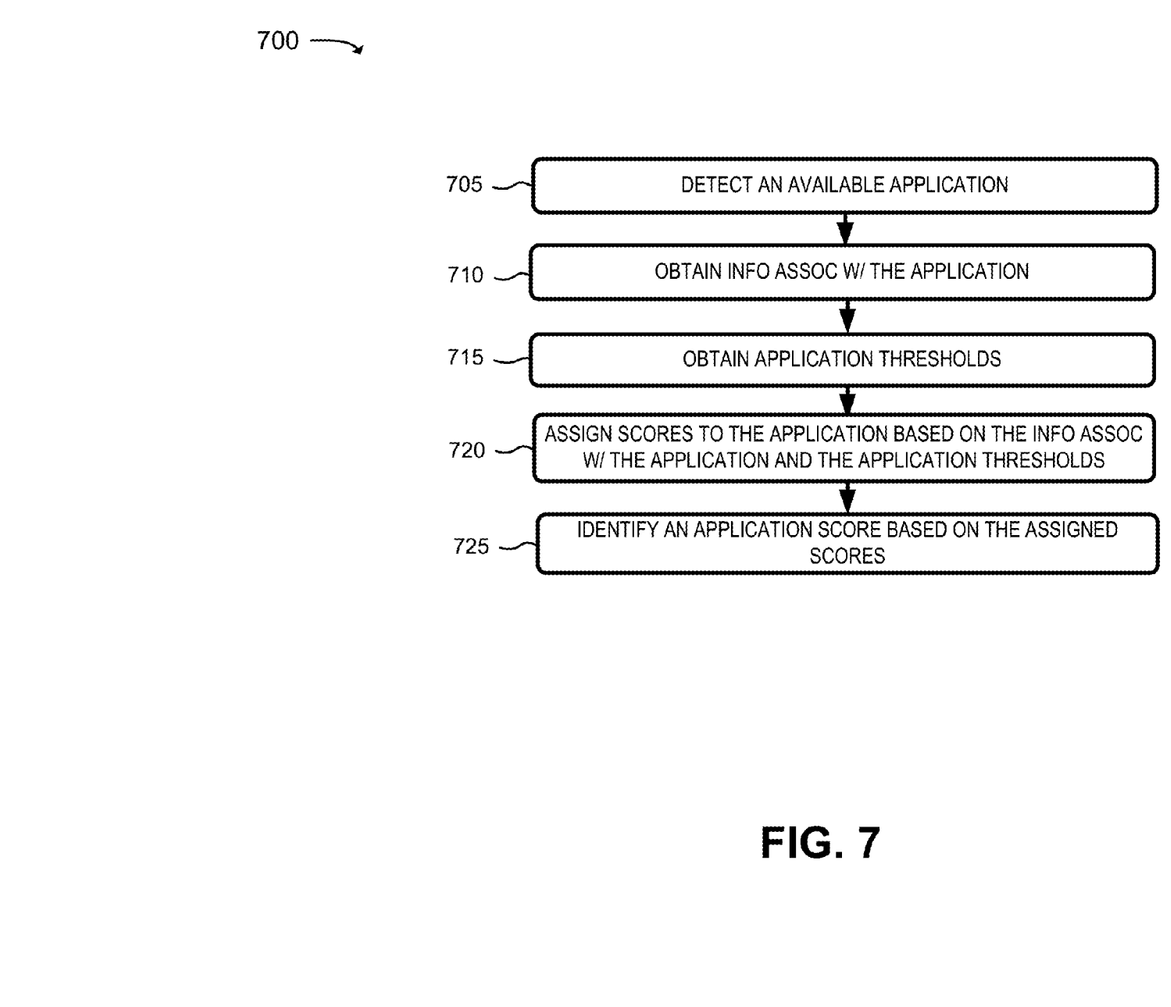
FIG. 7 is a flow chart of an example process for scoring an application according to an implementation described herein.

FIG. 7 is a flow chart of an example process 700 for determining an application score according to an implementation described herein. In one implementation, process 700 may be performed by profile server 140. In another implementation, some or all of process 700 may be performed by a device or collection of devices separate from, or in combination with, profile server 140.

As shown in FIG. 7, process 700 may include detecting an available application (block 705) and obtaining information associated with the application (block 710). For example, profile server 140 may identify an application, from a list of applications stored on user device 110 (e.g., obtained from application manager 130), that does not match any applications on a list of available applications that are available to be downloaded to user device 110. The list of available applications may be stored in database 150 and/or some other location, and/or may be managed by profile server 140.

Profile server 140 may query user device 110 and/or other user devices 110 to obtain information associated with the application, such as information associated with an author of the application, a vendor associated with the application, resources used by the application, a type of application, security incidents associated with the application, etc. Profile server 140 may also, or alternatively, communicate with a server device (e.g., a web server via the Internet) that provides access to information associated with the application security and/or certification (e.g., Verisign®, etc.); information that identifies application ratings; information associated with a type of application, application performance and/or resource usage (e.g., from the vendor, the author, and/or some other source); etc. Profile server 140 may store the information, associated with the application, in database 150 and/or some other location (e.g., in data structure 600 of FIG. 6).

As also shown in FIG. 7, process 700 may include obtaining application thresholds (block 715) and/or assigning scores to the application based on the information associated with the application and the application thresholds (block 720). For example, profile server 140 may retrieve, from a memory associated with profile server 140, information that identifies one or more thresholds that are to be used to evaluate the application. The thresholds may correspond to application ratings, application security, resource usage, etc. Profile server 140 may assign scores to the application based on the information associated with the application and the application thresholds.

Profile server 140 may, based on the information associated with the application, identify which portion of ratings, associated with the application, is associated with positive ratings. Profile server 140 may also, or alternatively, assign a ratings score (e.g., AR), to the application, based on the portion of ratings that are positive relative to ratings thresholds obtained from the application thresholds. Profile server 140 may store the assigned ratings score in data structure 600. Profile server 140 may, for example, assign a first ratings score (e.g., 0, 1, 2, etc.) when a first portion of ratings that are positive is greater than a first ratings threshold. Profile server 140 may, in another example, assign a second ratings score (e.g., 4, 5, 6, etc.) when a second portion of the ratings that are positive is not greater than the first ratings threshold and is greater than a second ratings threshold. Profile server 140 may, in yet another example, assign a third ratings score (e.g., 8, 9, 10, etc.) when a third portion of the ratings that are positive is not greater than the second ratings threshold.

Profile server 140 may, based on the information associated with the application, identify whether the application has been associated with an incident relating to security (e.g., associated with a loss of data, malicious software, etc.), a condition associated with network 160, and/or a condition associated with one or more user devices 110. Profile server 140 may assign a security score (e.g., AS) to the application based on a quantity of incidents and/or a level of severity associated with the incidents. Profile server 140 may store the assigned security score in data structure 600.

Profile server 140 may, for example, assign a first security score (e.g., 0, 1, 2, etc.) when a quantity of incidents is less than a first security threshold and/or a level of severity of the incidents is less than a first severity threshold. Profile server 140 may, in another example, assign a second security score (e.g., 4, 5, 6, etc.) when a quantity incidents is not less than the first security threshold and/or is less than a second security threshold. Profile server 140 may also, or alternatively, assign the second security score when a level of severity of the incidents is not less than the first severity threshold and/or is less than a second severity threshold. Profile server 140 may, in yet another example, assigned a third security score (e.g., 7, 8, 9, etc.) when a quantity of incidents is greater than the second security threshold and/or a level of severity of the incidents is not less than the second severity threshold. Profile server 140 may store the assigned security score in data structure 600.

Profile server 140 may, based on the information associated with the application, identify a quantity of resources expected to be used by the application relative to usage thresholds obtained from the application thresholds. Profile server 140 may assign a usage score (e.g., AU) to the application based on the quantity of resources expected to be used by the application relative to usage thresholds obtained from the application thresholds. Profile server 140 may store the usage score in data structure 600. Profile server 140 may, for example, assign a first usage score (e.g., 0, 1, 2, etc.) to the application when an expected quantity of resource usage is less than a first usage threshold. Profile server 140 may, in another example, store a second usage score (e.g., 4, 5, 6, etc.) when the expected quantity of resource usage is not less than the first usage threshold and is less than a second usage threshold. Profile server 140 may, in yet another example, assign a third usage score (e.g., 8, 9, 10, etc.) when the expected quantity of resource usage is not less than the second usage threshold.

As further shown in FIG. 7, process 700 may include identifying an application score based on the assigned scores (block 725). For example, profile server 140 may generate an application score (e.g., APP) based on the assigned ratings score, security score, and/or usage score (e.g., where $APP \cong AR+AS+AU$, and where AR is the ratings score, AS is the security score, and AU is the usage score).

In another example, the application score may be based on a weighted sum of the assigned ratings score, security score, and/or usage score (e.g., where $APP \cong W1*AR+W2*AS+W3*AU$, and where W1 is a first weighting factor associated with the ratings score, W2 is the second weighting factor associated with the security score, and W3 is the third weighting factor associated with the usage score). The weighting factors may identify a respective portion of each of the assigned scores to be included in the application score. For example, when each of the weighting factors are approximately equal (e.g., $W1+W2+W3 \cong 1$, where $W1=0.333$, $W2=0.333$, and $W3=0.333$), the application score may be based on equal portions of the assigned scores (e.g., where $APP \cong 0.333*AR+0.333*AS+0.333*AU$). In another example, application score may be based on unequal portions of the assigned scores (e.g., $W1=0.25$, $W2=0.75$, and $W3=0.00$). In this example, twenty-five percent of the application score may be based on the ratings score, seventy-five percent on the security score, and zero percent on the usage score (e.g., where $APP \cong 0.25*AR+0.75*AS+0.0*AU$).

The application score may be based on a variety of portions of the assigned score based on a manner in which the weighting factors are set by profile server 140 and/or by a system administrator associated with network 160. Profile server 140 may store the application score, the assigned scores, and/or the information associated with the application in database 130 (e.g., in data structure 600) and/or some other location.

Figure 8:
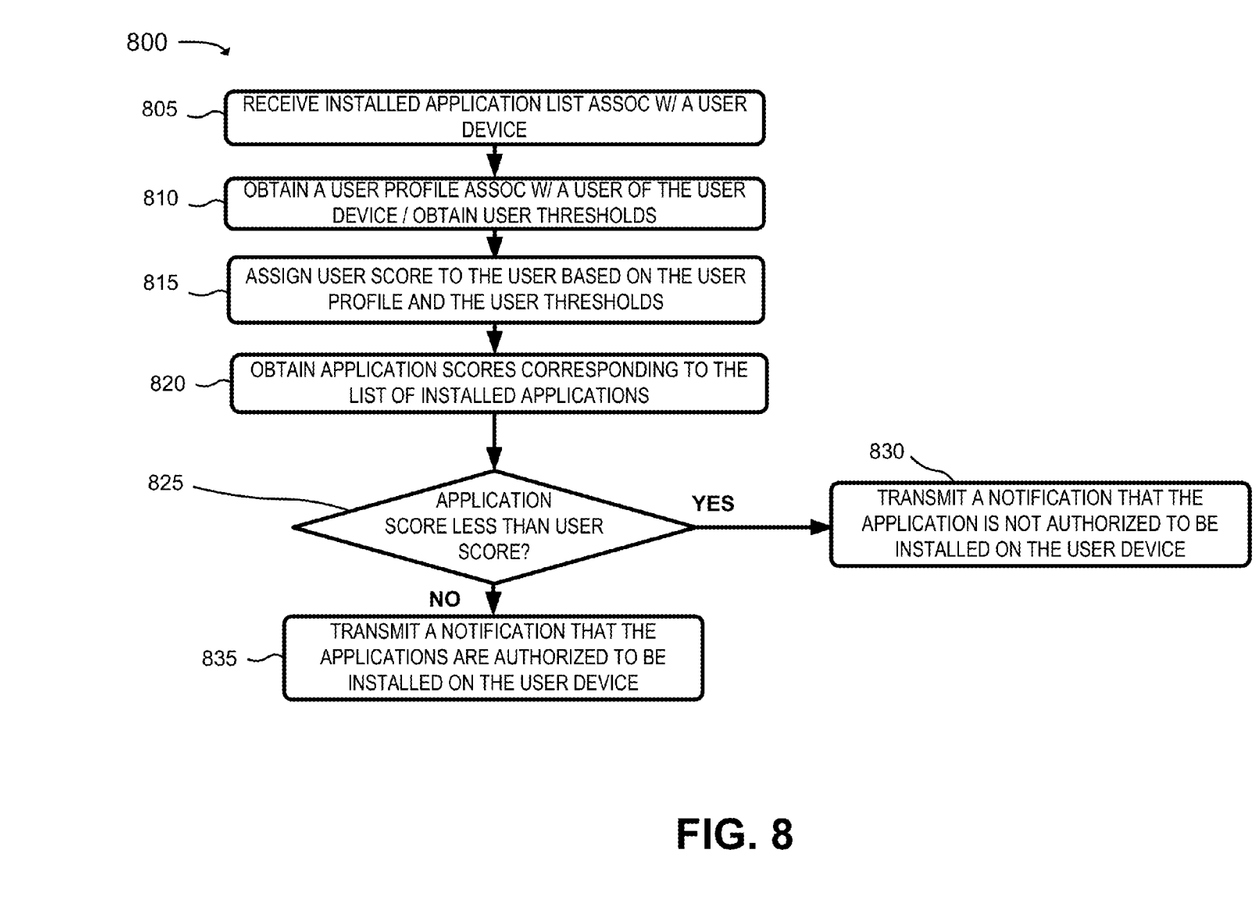
FIG. 8 is a flow chart of an example process for managing one or more applications installed on a user device according to an implementation described herein.
Figure 9:
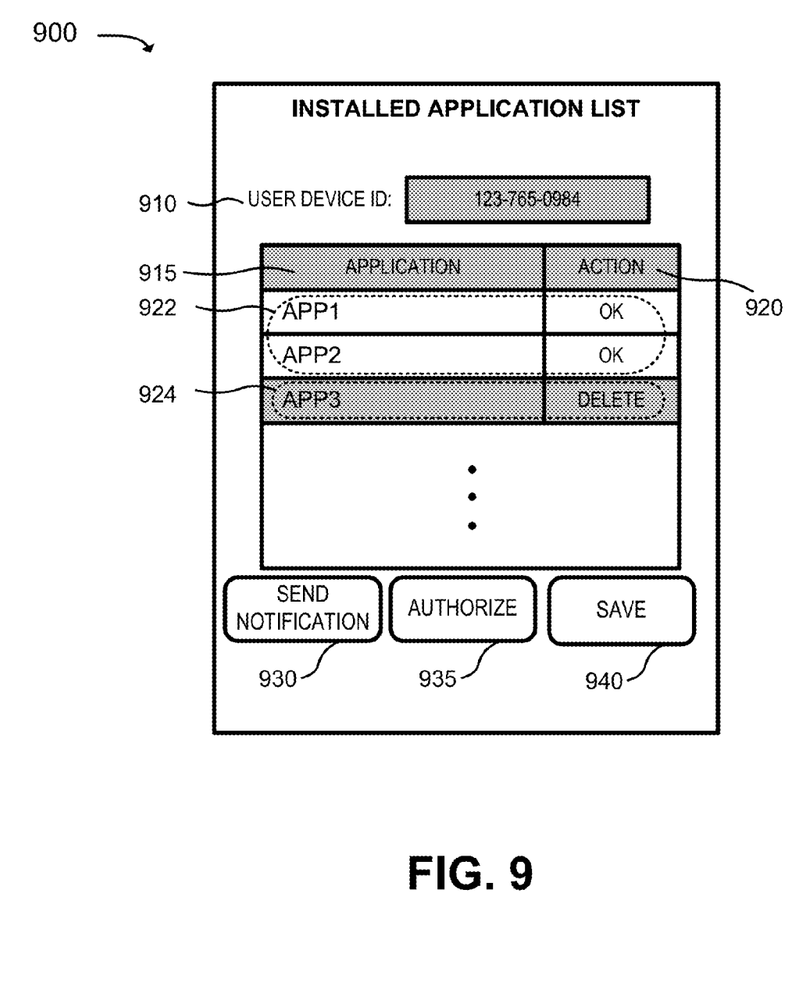
FIG. 9 is diagram of an example user interface that identifies applications stored on a user device.

FIG. 8 is a flow chart of an example process 800 for managing one or more applications installed on user device 110 according to an implementation described herein. In one example implementation, process 800 may be performed by application manager 130. In another example implementation, process 800 may be performed by a device or collection of devices, separate from or in combination with, application manager 130. FIG. 9 is diagram of an example user interface 900 that identifies applications stored on user device 110, according to, according to an implementation described herein. All or a portion of process 800 of FIG. 8 will be described below with references to user interface 900 of FIG. 9.

As shown in FIG. 8, process 800 may include receiving a list of installed applications associated with a user device (block 805) and, obtaining a user profile associated with a user of user device, and/or obtaining user thresholds (block 810). For example, application manager 130 may receive, from user device 110, a list of installed applications in a manner similar to that described above with respect to FIG. 3. Application manager 130 may, as a result of receiving the list of installed applications, retrieve, from database 150, a user profile associated with a user of user device 110. Additionally, or alternatively, application manager 130 may retrieve, from database 150, user thresholds to be used to determine a level of risk associated with the user. The user thresholds may include one or more thresholds associated with a user security (e.g., incidents, level of severity, etc.), a position level of the user, and/or a privilege level (e.g., a level and/or quantity of confidential information the user is authorized to access).

As also shown in FIG. 8, process 800 may include assigning a user score to the user based on the user profile and the user thresholds (block 815) and obtaining application scores corresponding to the list of installed applications (block 820). For example, application manager 130 may assign scores to the user based on the information associated with the user profile and the information associated with the user thresholds.

Application manager 130 may, based on the user profile, identify whether the user has been associated with an incident relating to security (e.g., associated with a loss of confidential information, an unauthorized disclosure of confidential information, etc.). Application manager 130 may assign a user security score (e.g., US) to the user based on a quantity of incidents relative to a user security threshold and/or based on a level of severity, associated with the incidents, relative to a user severity threshold. Application manager 130 may store the assigned user security score in data structure 500 of FIG. 5.

Application manager 130 may, for example, assign a first user security score (e.g., 0, 1, 2, etc.) when a quantity of incidents is less than a first user security threshold and/or a level of user severity is less than a first user severity threshold. Application manager 130 may, in another example, assign a second user security score (e.g., 4, 5, 6, etc.) when a quantity incidents is not less than the first user security threshold and/or is less than a second user security threshold. Application manager 130 may also, or alternatively, assign the second user security score when a level of user severity is not less than the first user severity threshold and/or is less than a second user severity threshold. Application manager may, in yet another example, assign a third user security score (e.g., 7, 8, 9, etc.) when a quantity of incidents is greater than the second user security threshold and/or a level of severity of the incidents is not less than the second user severity threshold.

Application manager 130 may, based on the user profile, identify a position level associated with a position held by the user of user device 110. Application manager 130 may assign a user position level score (e.g., UL), to the user, based on position level (e.g., level 1, level 2, level 3, etc.) held by the user. For example, application manager 130 may assign a first user position level score (e.g., 1) when the user holds a position at a first level (e.g., level 1). In another example, application manager 130 may assign a second user position score (e.g., 2), when the user holds a position associated with a second level (e.g., level 2).

In another example implementation, application manager 130 may assign a user position level score, to the user, based on a position level held by the user relative to a position threshold obtained from the user thresholds. For example, application manager 130 may assign a first user position level score (e.g., 0, 1, 2, etc.) when the user holds a position at a level that is greater than a first position threshold. In another example, application manager 130 may assign a second user position score (e.g., 5, 6, 7, etc.), when the user holds a position at a level that is not greater than the first position threshold and is greater than a second position threshold. In yet another example, application manager 130 may assign a third user position score (e.g., 8, 9, 10, etc.), when the user holds a position at a level that is not greater than the second position threshold. Application manager 130 may store the assigned user position score in data structure 500 of FIG. 5.

Application manager 130 may, based on the user profile, identify a privilege level at which the user is authorized to access confidential information. Application manager 130 may assign a user privilege score (e.g., UP), to the user, based on the privilege level (e.g., privilege 1, privilege 2, privilege 3, etc.) authorized for the user relative to a privilege threshold obtained from the user thresholds. For example, application manager 130 may assign a first privilege level score (e.g., 0, 1, 2, etc.) when the user is authorized to access a portion, of confidential information associated with an enterprise, that is greater than a first privilege threshold. In another example, application manager 130 may assign a second privilege level score (e.g., 4, 5, 6, etc.) when the user is authorized to access a portion of the confidential information that is not greater than the first privilege threshold and is greater than a second privilege threshold. In yet another example, application manager 130 may assign a third privilege level score (e.g., 8, 9, 10, etc.) when the user is authorized to access a portion, of the confidential information, that is not greater than the second privilege threshold.

Application manager 130 may generate a user score (e.g., USS) based on the assigned user security score, user position level score, and/or user privilege score (e.g., where USS≅US+UL+UP, and where US is the user security score, UL is the user position level score, and UP is the user privilege score). The user score may represent a highest level of risk that is authorized for applications that are stored on user device 110.

In another example, the user score may be based on a weighted sum of the assigned user security score, user position level score, and/or the user privilege score (e.g., where USS≅Y1*US+Y2*UL+Y3*UP, and where Y1 is a first user weighting factor associated with the user security score, Y2 is the second user weighting factor associated with the user position level score, and Y3 is the third user weighting factor associated with the user privilege score). The user weighting factors may identify a respective portion of each of the assigned scores to be included in the user score. For example, when each of the user weighting factors are approximately equal (e.g., Y1+Y2+Y3≅1, where Y1=0.333, Y2=0.333, and Y3=0.333), the user score may be based equal portions of the assigned scores (e.g., where USS≅0.333*US+0.333*UL+0.333*UP). In another example, the user score may be based on unequal portions of the assigned scores (e.g., Y1=0.25, Y2=0.50, and W3=0.25). In this example, twenty-five percent of the user score may be based on the user security score, fifty percent on the user position level score, and twenty-five percent on the user privilege score (e.g., where USS≅0.25*US+0.50*UL+0.25*UP).

Application manager 130 may, as result of assigning a user score to the user, retrieve application scores that correspond to the list of installed applications received from user device 110. Application manager 130 may, in one example, retrieve the application scores from data structure 600 stored within database 150 and/or a memory associated with application manager 130. Additionally, or alternatively, application manager 130 may obtain the application scores from profile server 140.

As further shown in FIG. 8, if an application score is less than the user score (block 825—YES), then process 800 may include transmitting a notification that the application is not authorized to be installed on the user device (block 830). For example, application manager 130 may compare the user score to each of the application scores to determine whether any of the applications, identified on the list of installed applications, are not authorized to be installed on user device 110. Based on a determination that an application score is less than the user score, application manager 130 may determine that the application is associated with a higher level of risk than is authorized for user device 110 and thus, is not authorized to be installed on user device 110.

Application manager 130 may provide a user interface (e.g., user interface 900 of FIG. 9), for display on a display device associated with application manager 130. As shown in FIG. 9, user interface 900 may include a collection of fields and/or buttons, such as a user device identifier (ID) field 910, an application field 915, an action field 920, a send notification button 930, an authorize button 935 and a save button 940. The quantity of fields and/or buttons, included within user interface 900, is provided for explanatory purposes only. In another implementation, there may be fewer fields and/or buttons, additional fields and/or buttons, different fields and/or buttons, and/or differently arranged fields and/or buttons than are shown in user interface 900.

User device ID field 910 may store information (e.g., a device identifier, a MDN, etc.) that identifies a particular user device 110 from which the list of installed applications was received. Application field 915 may store information associated with one or more applications (e.g., an application identifier, an application name, etc.) that are installed on the particular user device 110. Action field 920 may store information that identifies whether an application, installed on user device 110, is authorized to be installed on user device 110 and/or whether an application, not authorized to be installed, is to be removed from user device 110.

Send notification button 930 may, when selected by an operator of application manager 130, cause application manager 130 to send a notification to the particular user device 110 that identifies any applications that are not authorized to be installed on the particular user device 110. Authorize button 935 may, when selected by the operator, override a determination that an application is not authorized to be installed. The override may cause an unauthorized application to become authorized. Save button 940 may, when selected by the operator, cause the information stored within the fields of user interface 900 to be saved to a memory associated with application manager 130 and/or database 150.

Application manager 130 may identify one or more applications (e.g., APP1 and APP2), stored on user device 110, that are authorized to be installed on user device 110 and may store an indication (e.g., OK) that the applications are authorized to be installed on user device 110 (e.g., as shown by ellipse 922). Application manager 130 may also, or alternatively, identify an application (e.g., APP3) that is not authorized to be installed on user device 110 and may store another indication (e.g., DELETE) that the application is not authorized to be installed and/or is to be removed, over-written, or rendered inoperable on user device 110 (e.g., as shown by ellipse 924).

Application manager 130 may, based on the determination that the application is not authorized to be installed on user device 110, automatically transmit, to user device 110 and via notification server 120, a notification that the application is not authorized to be installed on user device 110. In one example, application manager 130 may transmit the notification when an operator, of application manager 130, selects a button on user interface 900 (e.g., send notification button 930 of FIG. 9).

User device 110 may receive the notification and may present a user interface that notifies a user, of user device 110, that the application is not authorized to be installed on user device 110. In one example, user device 110 may automatically remove, over-write, and/or render inoperable the application that is installed on user device 110. In another example, the user interface may prompt the user to acknowledge (e.g., by pressing a button on the user interface and/or on user device 110) the notification. Upon receipt of an indication that the user has acknowledged the notification, user device 110 may remove, over-write, and/or render inoperable the application. In yet another example, the user interface may prompt the user to identify whether the application is to remain installed on user device 110 or removed from user device 110. User device 110 may remove, over-write, and/or render inoperable the application when the user indicates, that the application is to be removed from user device 110.

In another example, application manager 130 may determine that an application score is not less than the user score, which may cause application manager 130 to determine that the application is authorized to be installed on user device 110. Application manager 130 may determine, however, that a type of application, to which the application corresponds, does not correspond to a job classification associated with the user. For example, application manager 130 may identify the type of application based on the application profile (e.g., obtained from data structure 600 of FIG. 6). Application manager 130 may identify one or more job classifications, associated with a position held by the user, based on the user profile (e.g., obtained from data structure 500 of FIG. 5). Based on the determination that the type of application does not correspond to the job classification, associated with the user, application manager 130 may determine that the application is not authorized to be installed on user device 110.

As further shown in FIG. 8, if an application score is not less than the user score (block 825—NO), then process 800 may include transmitting a notification that the applications are authorized to be installed on the user device (block 835). For example, application manager 130 may determine that all of the application scores are not less than the user score. Based on a determination that all of the application scores are not less than the user score, application manager 130 may determine that the level of risk, associated with the applications, is not higher than the level of risk authorized for applications stored on user device 110. Application manager 130 may transmit, to user device 110, a notification that all of the applications are authorized to be installed on user device 110. In another example, application manager 130 may transmit the notification that all applications are authorized to be installed when an operator, of application manager 130, overrides an unauthorized application (e.g., by selecting authorized button 935 of FIG. 9).

A system and/or method, described herein, may allow a server device, associated with a network, to monitor and/or control applications that have been downloaded to a user device that communicates with and/or is subscribed to the network. The system and/or method may permit the server device to obtain, from the user device, a list of applications that are stored on the user device. The system and/or method may allow the server device to obtain a user profile, associated with a user of the user device, that identifies a level of user risk associated with the user. The system and/or method may allow the server device to obtain application profiles, associated with the list of applications, that identify application risks associated with the applications.

The system and/or method may allow the server device to identify an unauthorized application, that is not authorized to be stored on the user device, based on the user profile and the application profiles. The system and/or method may cause the server device to transmit, to the user device, a notification that indicates that the unauthorized application is stored on the device. The system and/or method may, as a result of the notification, allow the user device to remove the unauthorized application from the user device, and/or to disable or otherwise render inoperable the unauthorized application.

The foregoing description provides illustration and description, but is not intended to be exhaustive or to limit the implementations to the precise form disclosed. Modifications and variations are possible in light of the above teachings or may be acquired from practice of the implementations.

While series of blocks have been described with regard to FIGS. 3, 7, and 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and/or methods is not limiting of the implementations. Thus, the operation and behavior of the systems and methods were described without reference to the specific software code—it being understood that software and control hardware can be designed to implement the systems and/or methods based on the description herein.

Further, certain portions, described above, may be implemented as a component or logic that performs one or more functions. A component or logic, as used herein, may include hardware, such as a processor, an application-specific integrated circuit (ASIC), or a field-programmable gate array (FPGA), or a combination of hardware and software (e.g., a processor executing software).

It should be emphasized that the term "comprises/comprising," when used in this specification, is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a server device, an instruction to determine whether a user device has stored an unauthorized application;
   obtaining, from the user device and as a result of the instruction, a list of one or more applications that are stored on the user device;
   obtaining, by the server device, one or more application profiles associated with the list of one or more applications, where each of the one or more application profiles identify a respective level of risk associated with each of the one or more applications of the list;
   obtaining, by the server device, a plurality of first scores that are associated with the respective level of risk associated with the one or more applications;
   retrieving, from a memory associated with the server device, a user profile associated with a user of the user device, where the user profile identifies at least one of:
     a job level associated with a job held by the user,
     a privilege level of the user for accessing confidential information, or
     a usage history for identifying whether the user has been associated with a security incident within a period of time before receiving the instruction;
   identifying, by the server device, a highest level of risk that is authorized for the one or more applications of the list based on the job level, the privilege level, or the usage history;
   generating, by the server device, a second score that corresponds to the highest level of risk associated with the one or more applications;
   determining, by the server device, whether a level of risk, associated with an application, of the one or more applications of the list, is greater than the identified highest level of risk, based on a comparison of one of the plurality of first scores and the second score; and
   transmitting, to the user device, a notification that the application is not authorized to be stored on the user device when the level of risk is greater than the identified highest level of risk.

2. The method of claim 1, where obtaining the list of the one or more applications further includes:
   transmitting to the user device and via another server device, a request for the list of the one or more applications; and
   receiving, from the user device and as a result of transmitting the request, the list of the one or more applications.

3. The method of claim 1, further comprising:
   retrieving, from the memory, information associated with another application of the one or more applications, where the information associated with the other application identifies at least one of:
     ratings, obtained from one or more other user devices, associated with the other application,
     an application history that identifies a quantity of security incidents associated with the other application, or
     resource usage that identifies a quantity of resources, associated with the one or more other user devices, used by the other application; and
   identifying an application score, associated with the other application, based on the ratings, the application history, or the resource usage.

4. The method of claim 3, where the highest level of risk is represented by a user score, the method further comprising:
   determining whether the application score is greater than the user score;
   determining that the other application is associated with a level of risk that is lower than the highest level of risk when the application score is less than the user score; and
   authorizing the other application to be stored on the user device when the other application is associated with a level of risk that is lower than the highest level of risk.

5. The method of claim 4, further comprising:
   identifying a type of application, that corresponds to the other application, based on the information associated with the other application;
   identifying one or more job classifications, associated with the job held by the user, based on the user profile; and
   determining that the other application is not authorized to be stored on the user device when the type of application does not correspond to any of the one or more job classifications.

6. The method of claim 1, where identifying the highest level of risk that is authorized for the one or more applications further includes:
   assigning a first score to the job level relative to other job levels;
   assigning a second score to the privilege level relative to other privilege levels for accessing confidential information;
   assigning a third score to the usage history based on a quantity of security incidents, with which the user was associated, within the period of time; and
   generating a fourth score that represents the highest level of risk based on a sum of one or more of the first score, the second score, or the third score.

7. The method of claim 6, further comprising:
   obtaining, from the one or more application profiles, one or more application scores, where each of the one or more application scores corresponds to the respective level of risk associated with each of the one or more applications;
   identifying at least one application score, of the one or more application scores, that is less than the fourth score; and
   transmitting, to the user device, a notification that at least one application of the one or more applications, associated with the at least one application score, is not authorized to be stored on the user device based on the identification that the at least one application score is less than the fourth score.

8. The method of claim 1, where transmitting the notification allows the user device to at least one of:
remove the application from the user device,
over-write the application, or
render the application inoperable.

9. A system comprising:
a storage device to store a plurality of first scores that identify levels of risk associated with a plurality of applications that are available to be downloaded to a user device; and
one or more devices to:
receive a list of one or more applications, of the plurality of applications, that are stored on the user device, wherein when receiving the list of the one or more applications, the one or more devices are further to:
transmit, to the user device and via another device, a request for the list of the one or more applications, and
receive, from the user device and in response to transmitting the request, the list of the one or more applications,
obtain, as a result of receiving the list, a user profile associated with a user of the user device, where the user profile identifies at least one of:
a pay grade, of a plurality of pay grades, associated with the user,
a level of access, of a plurality of levels of access, to confidential information authorized for the user, or
a quantity of security incidents with which the user is associated,
generate a second score that corresponds to a highest level of risk permitted for the one or more applications, where the second score is based on at least one of the pay grade, the level of access, or the quantity of security incidents,
determine whether one or more first scores of the plurality of first scores, associated with the one or more applications, is less than the second score, and
transmit, to the user device, a notification that an application, of the one or more applications, is not authorized to be installed on the user device when one of the one or more first scores, associated with the application, is less than the second score.

10. The system of claim 9, where the one or more devices are further to:
identify a job classification, associated with a job held by the user, based on the user profile, and
determine that another application is not authorized to be stored on the user device when a type associated with the other application is not permitted for the identified job classification.

11. The system of claim 9, where the one or more devices are further to:
detect a particular application that is not included among the plurality of applications, and
obtain information associated with the particular application, where the information associated with the particular application identifies at least one of:
a unique identifier associated with the particular application,
a type associated with the particular application,
ratings associated with the particular application,
a quantity of security incidents, with which the particular application is associated, during a period of time prior to detecting the particular application, or
a quantity of resources, associated with the user device, that are expected to be used, by the particular application, when executed by the user device.

12. The system of claim 11, where the one or more devices are further to:
obtain one or more application thresholds that are used to evaluate a level of risk associated with the particular application,
assign a first value to the ratings based on one or more ratings thresholds obtained from the one or more application thresholds,
assign a second value to the quantity of security incidents based on one or more incident thresholds obtained from the one or more application thresholds,
assign a third value to the quantity of resources based on one or more resource thresholds obtained from the one or more application thresholds, and
identify a fourth value, associated with the particular application, based on the first value, the second value, or the third value, where the fourth value corresponds to a level of risk associated with the particular application.

13. The system of claim 11, where, when obtaining the information associated with the particular application, the one or more devices are further to:
access one or more web servers that include information associated with the particular application, and
receive, from at least one of the one or more web servers, the information associated with the particular application.

14. The system of claim 9, where the quantity of security incidents correspond to at least one of:
an unauthorized disclosure of confidential information, or
a failure to properly secure confidential information.

15. One or more non-transitory computer-readable media, comprising:
one or more instructions, which when executed by at least one processor, cause the at least one processor to:
receive a list of applications installed on a user device;
obtain application profiles, associated with applications identified by the list of applications, that identify levels of risk associated with the applications;
obtain a plurality of first scores that are associated with the levels of risk associated with the applications;
obtain a user profile, associated with a user of the user device, that identifies a job level associated with the user, a level of security risk associated with the user, or a level of access to confidential information associated with the user;
identify a highest level of risk that is authorized for the user device based on whether at least one of:
the job level is greater than a first threshold,
the level of security risk is less than a second threshold, or
the level of access is greater than a third threshold;
obtain a second score that corresponds to the highest level of risk that is authorized for the user device;
determine whether any of the levels of risk are greater than the highest level of risk, based on a comparison of the plurality of first scores and the second score; and
transmit, to the user device, a notification that one of the applications is to be removed from the user device when one of the levels of risk, associated with the one of the applications, is greater than the highest level of risk.

16. The one or more non-transitory computer-readable media of claim 15, where one of the application profiles, associated with one of the applications, identifies whether at least one of:

the one of the applications has been identified as malicious software during a period of time prior to receiving the list of applications, a quantity of resources, associated with user device, that is used by the one of the applications when executed by the user device, or ratings associated with the one of the applications obtained from one or more other user devices.

17. The one or more non-transitory computer-readable media of claim 15, further comprising:

one or more instructions, which when executed by at least one processor, cause the at least one processor to provide a user interface via which the list of applications are displayed.

18. The one or more non-transitory computer-readable media of claim 17, further comprising:

one or more instructions, which when executed by at least one processor, cause the at least one processor to present, via the user interface, an indication that another one of the applications is not authorized to be stored on the user device.

19. The one or more non-transitory computer-readable media of claim 18, further comprising:

one or more instructions, which when executed by at least one processor, cause the at least one processor to:

receive, via the user interface, an instruction to authorize the other one of the applications to be stored on the user device when an operator selects a particular button associated with the user interface; and transmit, to the user device, another notification that indicates that the other one of the applications is authorized to be stored on the user device.

20. The one or more non-transitory computer-readable media of claim 15, further comprising:

one or more instructions, which when executed by at least one processor, cause the at least one processor to:

determine that another one of the applications, that is authorized to be stored on the user device, is associated with a type of application;

identify a type of job, that is held by the user, based on the user profile, where the user profile identifies one or more types of applications associated with performing the type of job;

determine that the other one of the applications is not authorized to be installed on the user device when the type of application does not match any of the identified one or more types of applications; and instruct the user device to remove the other one of the applications from the user device.

* * * * *